(12) United States Patent
Wahlstrom et al.

(10) Patent No.: US 11,009,708 B2
(45) Date of Patent: May 18, 2021

(54) SYSTEM AND METHOD FOR NEAR FIELD VIEWING

(71) Applicant: MOVIEMASK AS, Trondheim (NO)

(72) Inventors: Eirik Wahlstrom, Trondheim (NO); Harald Manheim, Trondheim (NO)

(*) Notice: Subject to any disclaimer, the term of this patent is extended or adjusted under 35 U.S.C. 154(b) by 0 days.

(21) Appl. No.: 16/628,237

(22) PCT Filed: Jul. 3, 2018

(86) PCT No.: PCT/NO2018/050175
§ 371 (c)(1),
(2) Date: Jan. 2, 2020

(87) PCT Pub. No.: WO2019/009733
PCT Pub. Date: Jan. 10, 2019

(65) Prior Publication Data
US 2020/0271934 A1    Aug. 27, 2020

(30) Foreign Application Priority Data

Jul. 5, 2017  (GB) ..................... 1710777
Jul. 5, 2017  (NO) .................... 20171105

(51) Int. Cl.
*G02B 27/01* (2006.01)
*G02C 7/02* (2006.01)

(52) U.S. Cl.
CPC .......... *G02B 27/0172* (2013.01); *G02C 7/02* (2013.01); *G02B 2027/0178* (2013.01)

(58) Field of Classification Search
CPC . G02B 27/0172; G02B 2027/017; G02C 7/02
USPC ............................................................. 345/8
See application file for complete search history.

(56) References Cited

U.S. PATENT DOCUMENTS

| | | | | |
|---|---|---|---|---|
| 8,182,087 | B2* | 5/2012 | Esser | G02C 7/02 |
| | | | | 351/159.01 |
| 10,365,502 | B2* | 7/2019 | Ho | G02C 7/027 |
| 2016/0270656 | A1* | 9/2016 | Samec | A61B 3/005 |
| 2017/0188813 | A1* | 7/2017 | Arnold | A61B 3/005 |
| 2017/0336599 | A1* | 11/2017 | Kim | G02B 13/005 |

* cited by examiner

*Primary Examiner* — Calvin C Ma
(74) *Attorney, Agent, or Firm* — Edgetech Law LLP

(57) ABSTRACT

A system for a headset comprising a lens system and a screen is provided. Viewing a screen at close range causes eye fatigue and discomfort. The invention solves these problems and provides a compact system for near field viewing in 2D. The invention is realised using a lens system in the form of a unitary lens system, moulded as a single piece to be used with both eyes, where the lenses may optionally comprise a prismatic effect.

19 Claims, 7 Drawing Sheets

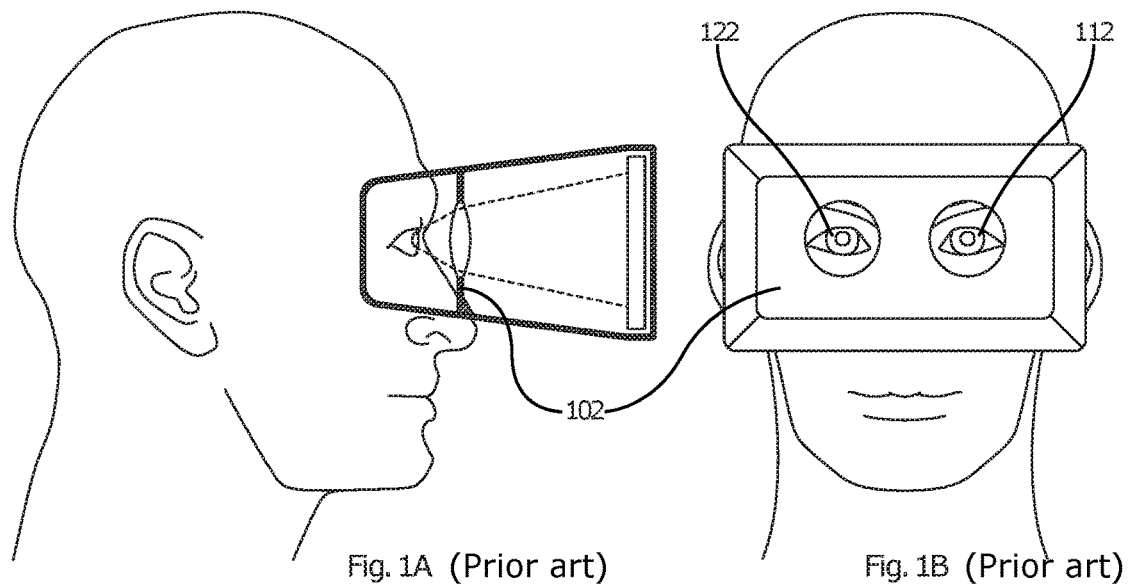
Fig. 1A (Prior art)   Fig. 1B (Prior art)
Fig. 1C (Prior art)
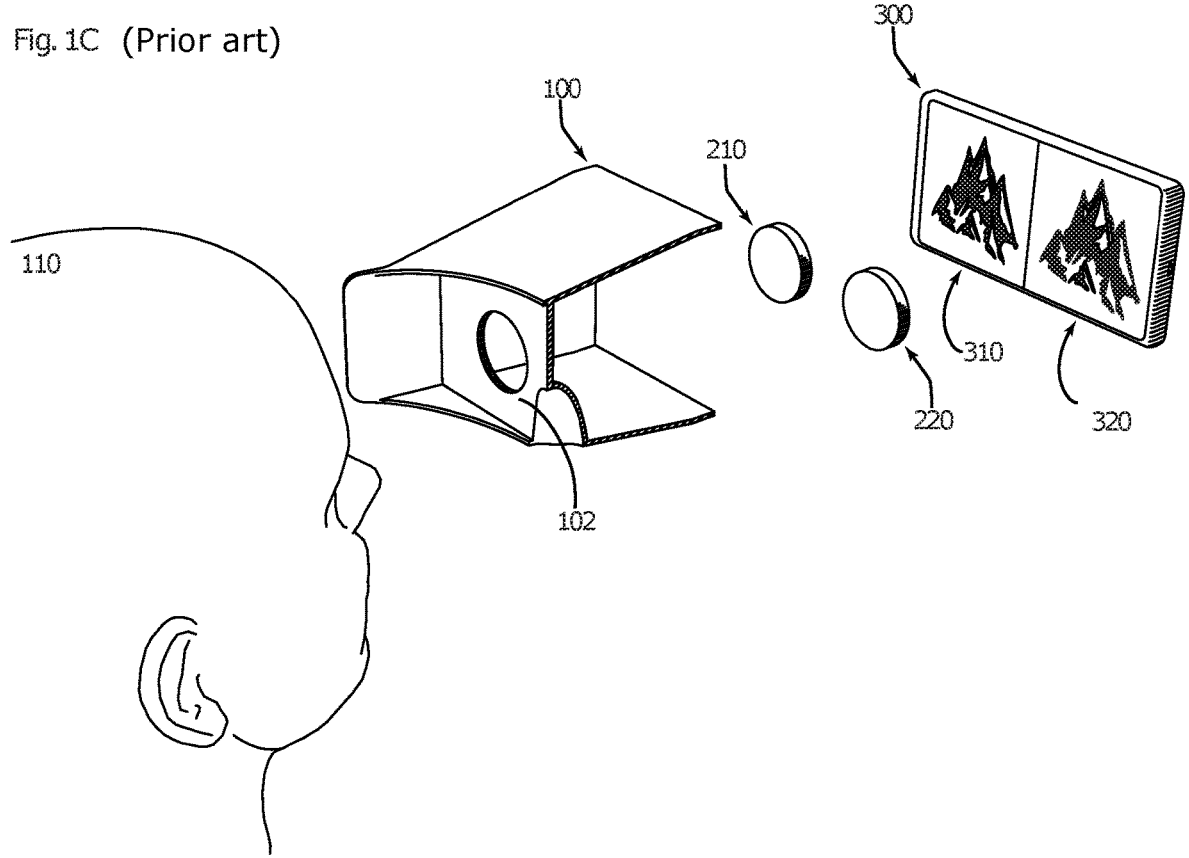

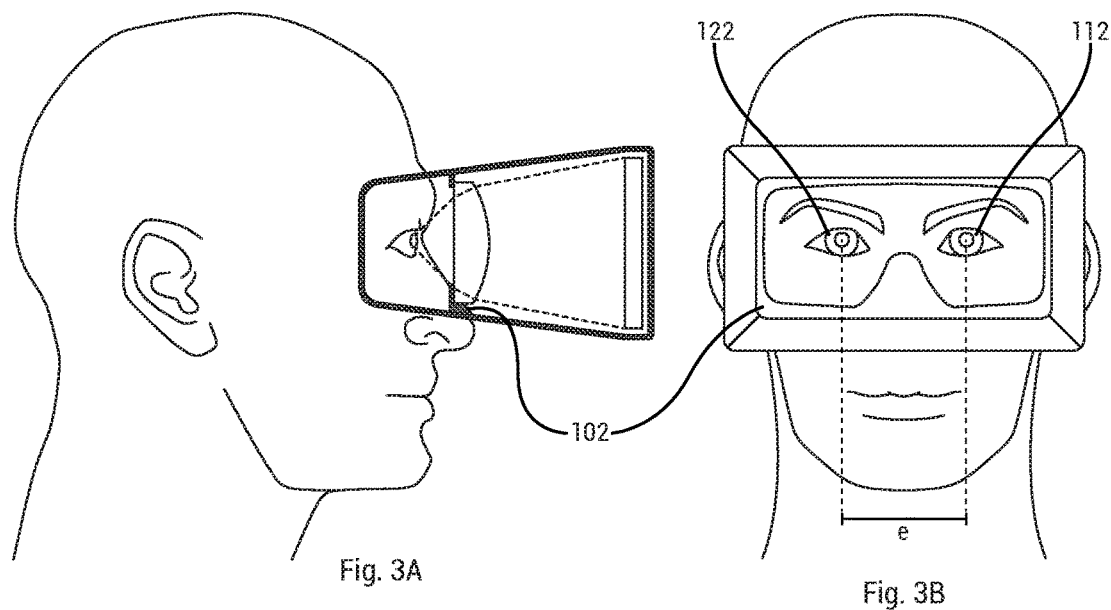
Fig. 3A
Fig. 3B
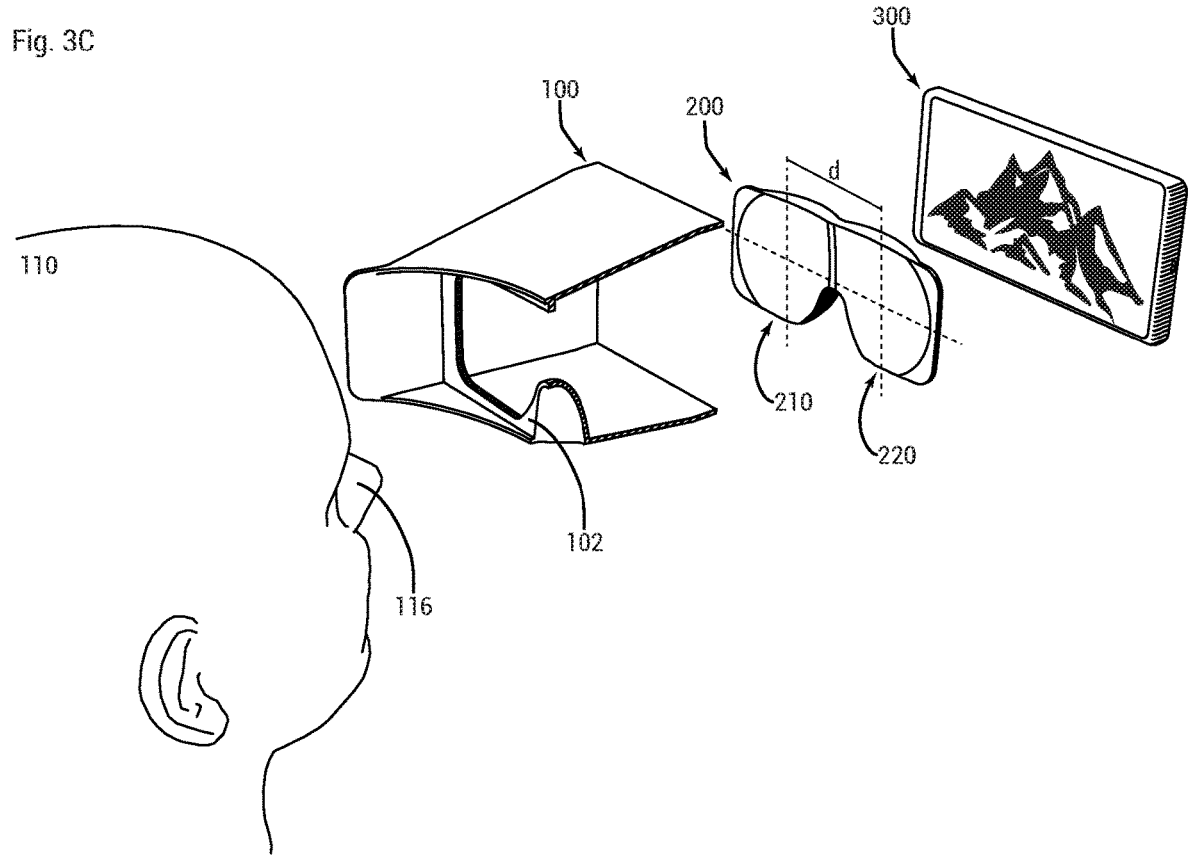
Fig. 3C

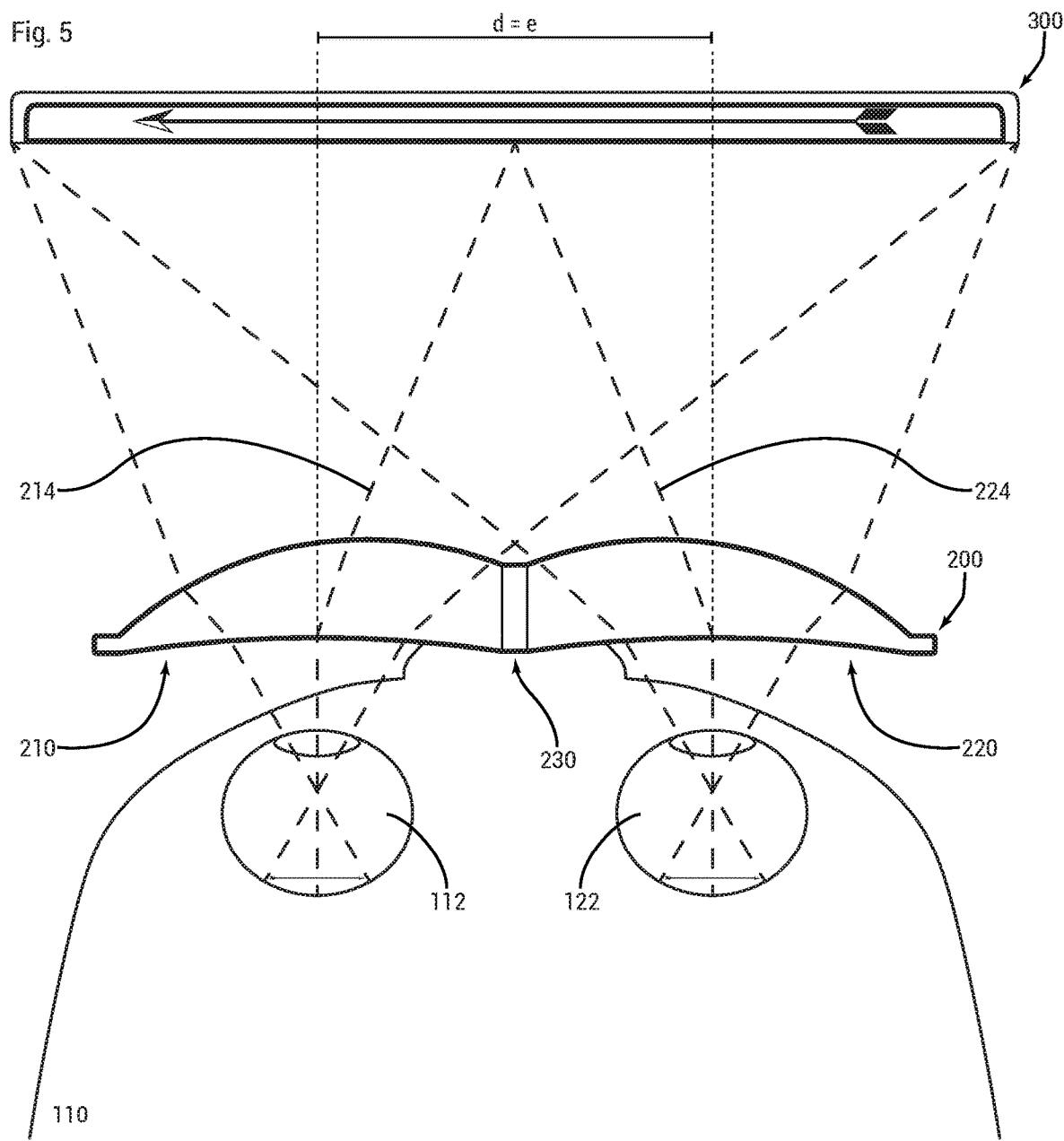

212 — 222
A — A

B
e

A-A

B-B 230
200
210
220

SYSTEM AND METHOD FOR NEAR FIELD VIEWING

BACKGROUND OF THE INVENTION

Field of the Invention

The invention relates to imaging optics in general and more specifically a system and a method for near field viewing which can be utilized for a headset mounted screen.

Background Art

State of the art is reflected in modern headsets such as virtual reality (VR) glasses or augmented reality (AR) glasses or headsets. In such systems a pair of lenses, one for each eye are positioned between a screen and each eye of a user.

The problem with these systems is the complexity of the optics, the need for accurate and precise positioning and discomfort when using such a system for an extended period of time.

From prior art one should refer to:

WO 2016009434 discloses an optical magnification. The system comprises a structure having a frame configured to removably secure a display device thereto; and a pair of spaced apart ocular systems, mounted on the structure in front of the frame for providing a view of the display device one mounted on the frame, wherein each of the ocular systems has an aspheric optical surface and provides a prismatic refraction. Notably the lens system disclosed in WO 2016009434 is not made as a unitary body.

Further WO 2016009434 discloses that: "for purposes of better understanding some embodiments of the [WO 2016009434] invention, reference is first made to the construction and operation of a side-by-side, near eye 3D display as illustrated in FIG. 1 [of WO 2016009434]". In addition, WO 2016009434 also discloses that: "It was found by the [WO 2016009434] inventor that regular Operating System (OS) and 2D content cannot be viewed using the system shown in FIG. 1 [of WO 2016009434]. In order to operate such a system to view 2D content a special software layer above the OS is required. Alternatively, the operator is required to remove the smartphone from the display system and view the content not through the display system. Therefore, the operation of such display systems is uncomfortable and is limited to side-by-side contents." It can be deducted from the citation above that the optical magnification of WO 2016009434 relates to 3D technology and not 2D technology.

EP 0269259 A1 discloses a visor on which an image source, produced by cathode ray tubes, is optically reflected on the partially reflective visor surface in the user's line of sight and further to the eye of the user. EP 0269259 A1 does not use a lens system and relates to augmented reality by reflection for a niche market for military use.

WO 0106301 A1 discloses low cost glasses using a unitary lens system with two lenses, which are convenient to carry, easy to maintain and recyclable. WO 0106301 A1 glasses do not have a prismatic component. Further WO 0106301 relates to spherical lenses technology for the mass market.

Prismatic Eyeglasses for Macular Degeneration, KINKADE, Randolph C., 2012.11.08, (http://lowvisioneyeglasses.blogspot.no/2012/11/prismatic-eyeglasses-for-macular.html) is a webpage which discloses lenses and prismatic corrections for eyeglasses. The webpage relates to a specialised field, macular degeneration and other low vision medical conditions, and targets a niche market of user with these medical conditions, WO 2007/058706 A2 discloses lighted eyeglasses for individuals with low vision. WO 2007/058706 A2 relates to the specialised field of low vision, including macular degeneration and other low vision medical conditions, which cannot be sufficiently compensated by using corrective lenses (glasses or contact lenses) or surgery.

There is therefore a need for a method and a system to overcome the above mentioned problems.

SUMMARY OF THE INVENTION

Problems to be Solved by the Invention

Therefore, a main object of the present invention is to provide an optical system for viewing a headset mounted display and a method for making such a display.

Means for Solving the Problems

The objective is achieved according to the invention by a lens system as defined in the preamble of claim 1, having the features of the characterising portion of claim 1, and a headset as defined in the preamble of claim 12, having the features of the characterising portion of claim 12.

A number of non-exhaustive embodiments, variants or alternatives of the invention are defined by the dependent claims.

The claimed system attains the above-described objective by a unitary lens system comprising a first and second lens, formed as a unitary body.

In a first aspect of the invention a lens system is provided for a user having a first and second eye separated by an inter pupillary distance e, the lens system comprising a first lens having a first optical centre, a second lens having a second optical centre, wherein the first and second optical centre are separated by a distance d, wherein the distance d between the first and second optical centre align with the user's pupils inter pupillary distance e when in use, wherein the lens system is made in a unitary body, and the lenses are provided with a prismatic component in the interval +4-+14.

In one embodiment the lenses are provided a lens spherical dioptre is in the interval +4-+12. In a preferred embodiment the lenses are provided a lens spherical dioptre is in the interval +5-+10. In a more preferred embodiment the lenses are provided a lens spherical dioptre is in the interval +6-+7.

In one preferred embodiment the lenses are provided with a prismatic component +2 greater than the spherical dioptre.

In one embodiment the lenses further comprises a notch to accommodate the user's nose.

In one embodiment the lenses are provided with bridge part between the first and second lens and above the notch, wherein the bridge part is provided with means for illumination.

In one embodiment the lens system is provided with a perimetral illumination system.

In one embodiment the lens system is provided with the distance d is 60 mm 62 mm.

In a second aspect of the invention a headset is provided for viewing a headset mounted screen, further comprising a lens system comprising a first lens having a first optical centre, a second lens having a second optical centre, wherein the first and second optical centre are separated by a distance d, wherein the distance d between the first and second optical centres align with a user's pupils inter pupillary distance e when in use, wherein the lens system is made in a unitary body, wherein the lenses are provided with a prismatic component in the interval +4-+14, wherein the lens system is interposed between the screen (300) and the user's eyes.

In one embodiment the distance d between the first and second optical centre is chosen in relation to the inter pupillary distance e, so that the perceived reading distance is in the interval 25 cm-50 cm.

In a preferred embodiment the distance d between the first and second optical centre align with the user's pupils inter pupillary distance e when in use, so that the perceived reading distance is 30 cm.

Effects of the Invention

The present invention comprises a technological advantage over known systems and methods by use of a unitary lens system in that it allows for a stress less view of an object close up to the eyes.

The present invention provides several further advantageous effects:
  it makes it possible to look close up to an object while simultaneously maintain depth of vision because both eyes can focus on the same object,
  it makes it possible to make compact optics for viewing, and
  it makes it possible to use a large fraction of the area of the viewing surface in the view field within the head set, typically the entire area of a smart phone placed in the headset.

BRIEF DESCRIPTION OF THE DRAWINGS

The above and further features of the invention are set forth with particularity in the appended claims and together with advantages thereof will become clearer from consideration of the following detailed description of an [exemplary] embodiment of the invention given with reference to the accompanying drawings.

The invention will be further described below in connection with exemplary embodiments which are schematically shown in the drawings, wherein:

FIG. 1A shows a side view of a typical VR system according to prior art,

FIG. 1B shows a front view of the embodiment of FIG. 1A,

FIG. 1C shows an exploded view of the embodiment of FIG. 1A,

FIG. 3A shows a side view of an embodiment of the present invention,

FIG. 3B shows a front view of the embodiment of FIG. 3A,

FIG. 3C shows an exploded view of the embodiment of FIG. 3A,

FIG. 5 shows an exemplary overview of optical paths of an embodiment of the present invention with prismatic lenses.

DESCRIPTION OF THE REFERENCE SIGNS

Figure 2:
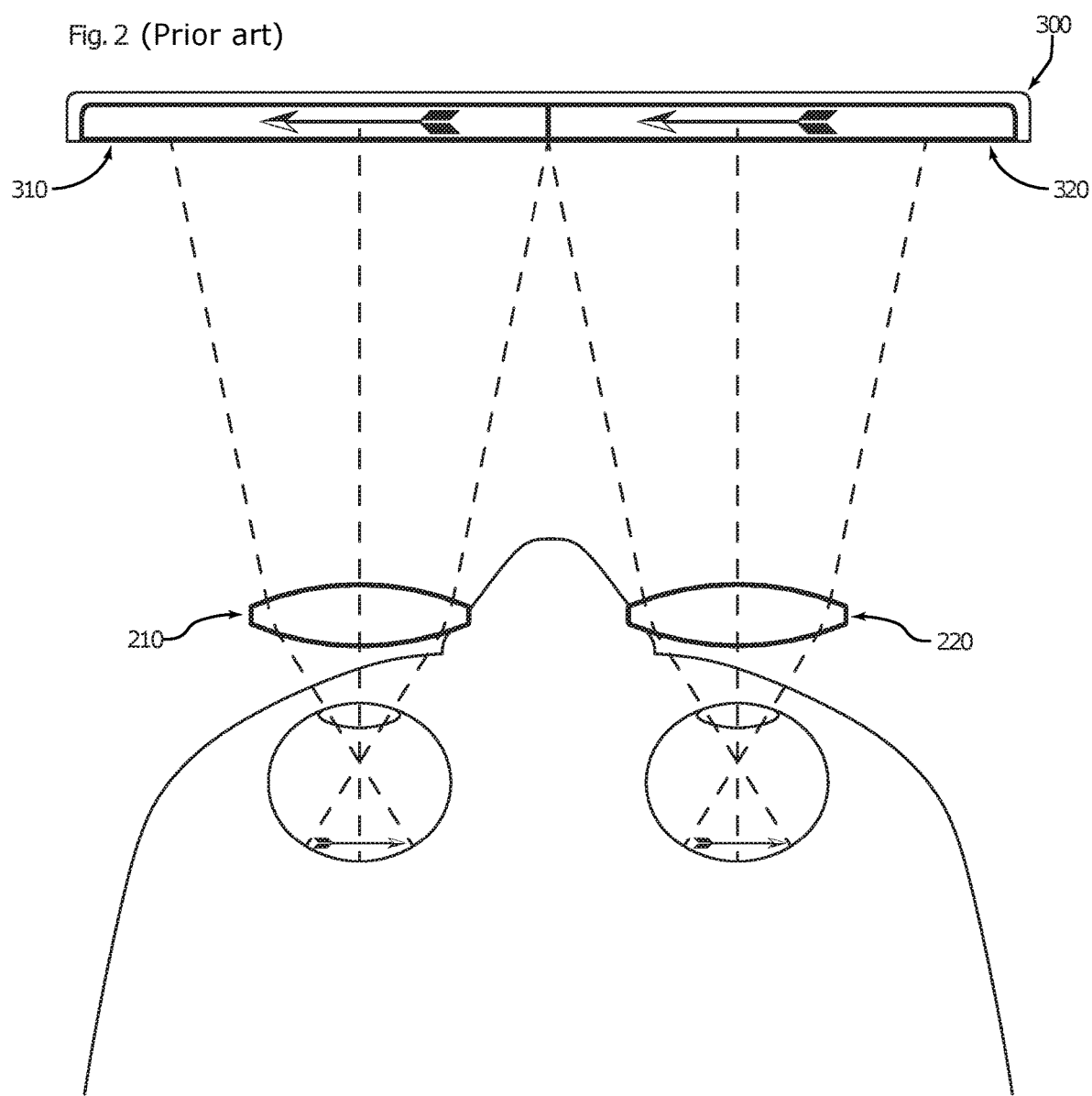
FIG. 2 shows the optical paths of the prior art system shown in FIG. 1.

The following reference numbers and signs refer to the drawings:

| | |
|---|---|
| 100 | Headset |
| 102 | Frame |
| 110 | User |
| 112, 122 | User's eyes |
| 114, 124 | First and second optical path |
| 116 | Nose |
| 200 | Lens system |
| 202 | Attachment |
| 204 | Perimetral illumination system |
| 210 | First lens |
| 212 | First optical centre |
| 214 | First optical axis |
| 220 | Second lens |
| 222 | Second optical centre |
| 224 | Second optical axis |
| 230 | Bridge part |
| 232 | Bridge mounted illumination |
| 300 | Screen |
| 310 | First area |
| 320 | Second area |
| d | Distance between optical centres 212 and 222 |
| e | Distance between the user's eyes 112 or inter pupillary distance IPD |

DETAILED DESCRIPTION OF THE INVENTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The following definitions will be used:

Spherical Power: Spherical Power of a lens, as described in Dioptres, is simply 1000 divided by the focal length of the lens in mm. Thus 6D spherical power lenses have a focal length of '1000/6=166.66 mm'. Since these lenses are Plano-convex lenses, the relationship between focal length and radius of curvature is $$f=R/(n-1)$$

where 'f' is the focal length, 'R' is the radius of curvature and 'n' is the refractive index. For PMMA which has a refractive index of 1.49, this means that the radius of curvature of the convex side is about 81.6 mm for the 6D lens.

Prismatic Power:

Prismatic power of 1D is defined as a prism that deviates an on-axis incident beam of light by 1 cm over a distance of 100 cm (i.e. 1 meter). Thus the prismatic lens with the 6 Dioptres spherical power has an 8 Dioptres prismatic power. This means that the prism deviates the incoming beam by 8 cm for every 1 m, which works out to a deviation angle of 4.57 degrees. For small angles, the relationship between the angle of deviation and the base angle of the prism is given by the formula:

$$d=(n-1)A$$

where 'A' is the base angle of the prism, 'n' is the refractive index and 'd' is the angle of deviation. So in this example of the 8D prism, 'd=4.57' and 'n=1.49' so that would make A=4.57/0.49=9.32 degrees.

The invention will be further described in connection with exemplary embodiments which are schematically shown in the drawings, wherein FIG. 1A shows a side view of a VR system according to prior art. The VR system is contained within a headset 100 comprising a screen 300 divided into a first 310 and second 320 screen areas. When worn by a user 110 the user's eyes 112 are positioned with respect to the headset in such a way that one eye views the first area 310 through a first lens 210 and the second area 312 through a second lens 220. FIG. 1B shows a front view illustrating a typical size of the lenses. As shown in FIGS. 1B and 1C there are two lenses separately mounted in a frame.

FIG. 2 shows the optical paths of the system shown in FIG. 1. As is shown there are two paths, one for each eye, and they do not overlap. The lenses 210 and 220 provide strain relief to the user, allowing the user to focus on the screen close to the eyes.

This means that in order to maintain an appropriate image aspect ratio the screen areas 310 and 320 have to be scaled down and thus one effectively only uses less then half the area of the screen 300, typically a quarter of the area.

Principles Forming the Basis of the Invention

The inventor has realised that in cases where 3D effects are not required it is possible to utilize the entire screen area of the screen 300. To maintain good eye strain relief a typical adaption would lead to an extended optical path which in turn would lead to the screen being distant and thus subtend a smaller spatial angle.

FIG. 3 shows the problems have been overcome by a unitary lens system 200 comprising a first lens 210 having a first optical centre 212 and a second lens 220 having a second optical centre 222. The distance d between the optical centres is close to or less to the distance e between the eyes. Also the lenses can be provided with a prismatic component to refract the light beams, thus providing further eye relief and the impression that the screen is substantially further away in front of the user than what it really is. This allows for a short optical path and a compact system.

The inventor has found that it is important that the lenses are carefully aligned. While stereoscopic viewing allows determining a real or perceived distance to an object based on parallax between the eyes the parallax is in the plane defined by the eyes and the object. Misalignment out of this plane is uncomfortable and some find it unacceptably uncomfortable. Such misalignment can occur if one lens is rotated around the optical axis. Since the lenses have a prismatic component also a rotation around the optical axis can be unacceptable. This problem is overcome by a unitary lens system since the alignment is precisely defined by the mould. Thus the mould ensures both a cost effective means of production but also ensures all optical parameters are correct and reproducible.

Also objects placed close to the eyes means a short parallax, giving the user a feeling that the "eyes are crossing" which is uncomfortable even for short periods of time.

Figure 4:
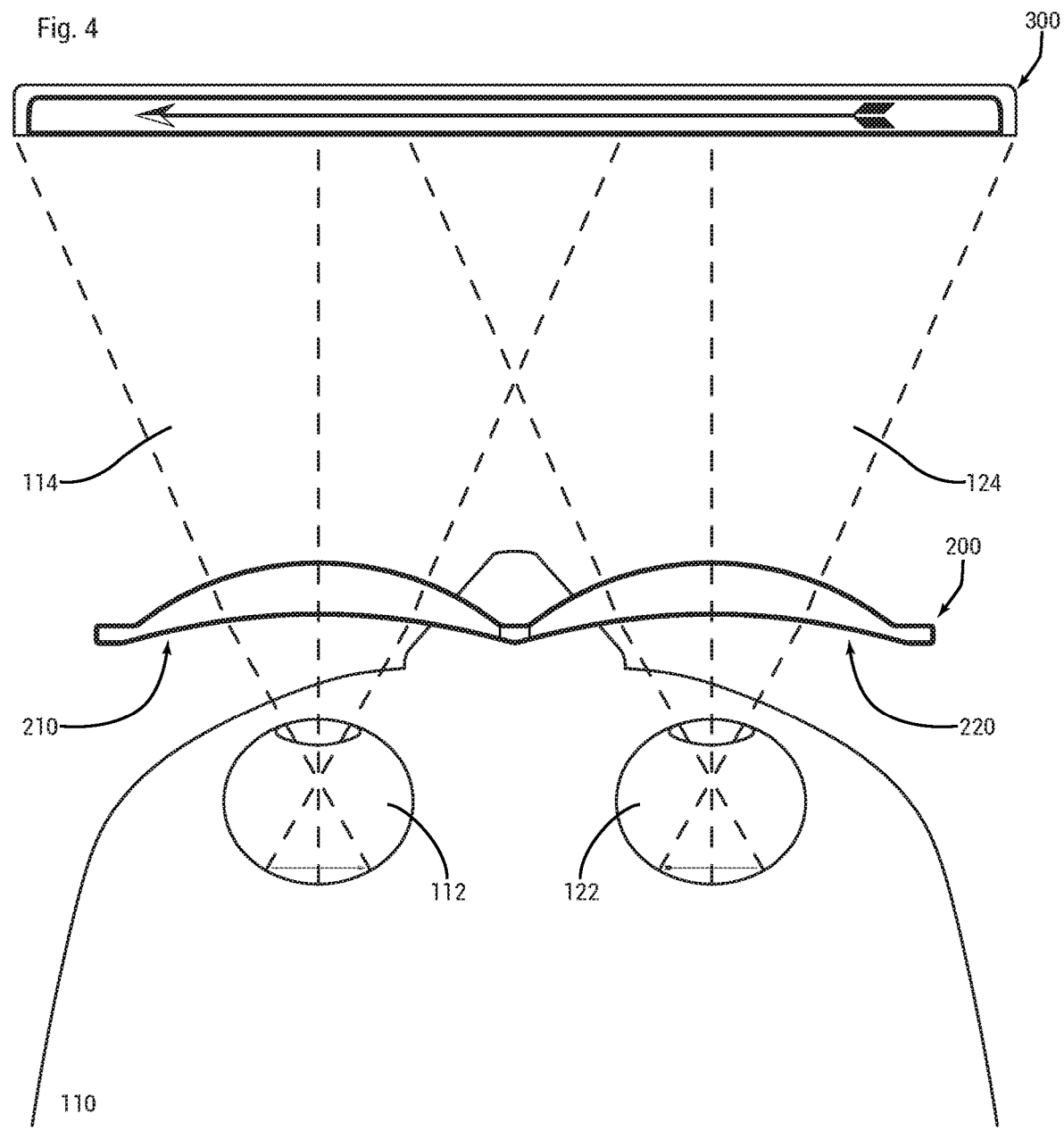
FIG. 4 shows an exemplary overview of optical paths of an embodiment of the present invention.

FIG. 4 shows an exemplary overview of optical paths of an embodiment of the present invention with an image formed on a screen 300. The image covers substantially all of the area. A first lens 210 focuses light from the screen to an eye 112, the light forming a first optical path 114. A second lens 220 focuses light from the screen to a second eye 122, the light forming a second optical path 124. Unlike the case for VR systems both light paths originate from the same image on the same screen 300.

The lens system 200 is positioned firmly with respect to the screen using a frame 102, preferably located within an enclosed body of the headset 100 to exclude ambient light.

Selecting optimal values for spherical and prismatic powers is not immediately obvious. At first glance one would make the immediately apparent assumptions for what one would consider a stress free viewing.

The first assumption would be infinity focus: Most people feel that the human eye is least stressed when viewing a far away object, i.e. an object essentially at infinity. In such a situation, the eyes are not 'converging' since they are viewing an object an infinity.

The second assumption would be stress free close-in viewing: Most optics literature states that although infinity object viewing is the least stressful, most humans are still very comfortable viewing an object as long as it is at least 25 cm away from the eye. At this distance, most people are able to focus on the object easily without any optical aids. This also means that the human eye can easily 'converge' on an object at a distance of 25 cm, which amounts to about 7.3 degrees of convergence between the two eyes assuming a standard IPD of 64 mm.

It can be shown that this would result in a lens having a prismatic power of about 19 Dioptres which while it would work it would be unwieldy to manufacture and somewhat uncomfortable to wear and use.

A different approach was to make what here is termed a near viewing assumption:

Without aid, eye focussed at 250 mm.

With 6 Dioptres lens, eye will then focus at 96 mm.

Without aid, eye has convergence of 7.3 degrees (so as to cover 32 mm over 250 mm) but after the 6 Dioptres prismatic lens has reduced the object distance to 96 mm, one now needs to increase the convergence of the eye from 7.3 degrees to 18.5 degrees.

This requires a prismatic power again of around 19.8 Dioptres.

So both assumptions lead to prismatic powers that are clearly too large. A prismatic power of about 19D involves a prism base angle of around 22 degrees. Having such a large prism leads to an unsatisfactory viewing experience.

Without any optics, the distance a person has to converge the eyes and the distance this person has to focus, are the same. This is known as vergence-accommodation coupling.

Using lenses the read distances can differ from the perceived distances. It is still preferred to maintain the vergence-accommodation coupling.

BEST MODES OF CARRYING OUT THE INVENTION

For a more comfortable and practical solution it was found that one could make a blend of the above assumptions:

It was initially assumed that the human eye was focussed at infinity but had a convergence of 7.3 degrees. Thus one uses the 'Infinity Focus' assumption while calculating the spherical power and viewing distance while using the 'Near Focus' assumption while calculating the prismatic power. Based on this it was calculated as follows Viewing Distance=166 mm.

Assuming eye focussed at infinity, focal length of lens needed for this viewing distance is 166 mm. Thus spherical power of the lens is 1000/166=6 Dioptres. Total convergence angle required is a tan (32/166)=11 degrees. However, assuming that the human eye is already converging at 7.3 degrees, additional convergence required by prismatic power of the prismatic lens is only 3.7 degrees. This works out to a prismatic power of 6.5 Dioptres. This was used as a starting point and experimented with a few prismatic powers around 6.5 Dioptres. It was found that for an 8 Dioptres prismatic power, most users found the performance as satisfactory.

Multiple tests and trials led to the 6 Dioptres spherical/8 Dioptres prismatic power combination. As can be seen, it does not fit perfectly with the calculations of either set of assumptions but is a trade off that has worked well in tests.

The embodiment of the apparatus according to the invention shown in FIGS. 3 and 4 comprises a lens system in the form of a unitary optical system, moulded as a single piece to be used with both eyes.

The exploded view of FIG. 3C shows and the assembled side view of FIG. 3A show the relative position of the parts. In a preferred embodiment (not shown) the frame 102 further comprises an adjustable extender that permits adjustments of the distance between the eyes 112, 122 and the lens system 200. This allows for use with glasses or correction to avoid need for use of glasses when using the headset.

The lens system 200 is typically moulded as a single piece from a clear material. Acryl has found to work well. This material has a good refractive index while also being reasonably scratch resistant. The mould comprises shapes that accommodate fluid material to set as lenses.

On completing the moulding process the system 300 comprises a unitary lens system 300, further comprising a first and second lens 210 and 220 respectively. These lenses have an optical centre each that are separated by a distance d which is approximately the inter pupillary distance e. It is known that such distances vary and thus a range of lens systems would be beneficial, adapted after measuring the distance e. Such measurements are well known in the art.

It is preferred to select a value of d depending on the value of e such that the difference corresponds to a comfortable reading distance. Typical distances are in the interval 20 cm-90 cm, comfortable distances are in the interval 30 cm-60 cm, more preferably in the interval 35 cm-45 cm, or 40 cm in order to observe finer details and also make sure to maximize the useful spherical angle of the screen.

FIG. 4 shows an exemplary overview of optical paths of an embodiment of the present invention with spherical lenses. The lens spherical dioptre is in the interval +4-+12, more preferably in the interval +5-+10, and most preferably about +6-+7. Tests have shown that both plano-convex and positive meniscus designs will work. This results in the optical axes 214, 224 of the lenses being substantially parallel. While the lenses will bring the screen 300 up close there will be some eye strain to converge or "cross" the eyes to focus on the same part of the screen with both eyes. There is also an issue with the nose setting a limit to how much the eyes can be converged, thus leading to limitations on how much area can be seen by both eyes simultaneously.

FIG. 5 shows an exemplary overview of optical paths of the lens system of FIG. 4 with prismatic lenses where the prismatic components are indicated. The prismatic effects of the lenses are selected so that these shorten the optical path from the range defined above, typically 40 cm, down to the real distance between the eyes and the screen 300. The prismatic lenses provide a refractive component to the light paths so that the screen can be positioned close to the lens system yet provide good strain relief. The prismatic component is in the interval +4-+14, and more preferably +2 greater than the spherical dioptre. This typically means preferably in the interval +5-+12, and most preferably about +8-+9.

The prismatic component has the effect of refracting the optical axes 214, 224 so that they intersect. This means there is less need for the eyes to "cross" since the crossing is made with the prismatic components.

In use the lens system is places close to the eyes in a position similar to reading glasses. It is therefore preferred to have a notch in the lens body to accommodate the nose 116 of the user 110. The prismatic effect means the viewed image is perceived to be forward and the area around the nose will therefore not obscure the image. For this reason the area above the notch does not have to be provided with an optical surface but is nevertheless part of the unitary lens body and is called the bridge part 230.

Figure 6B:
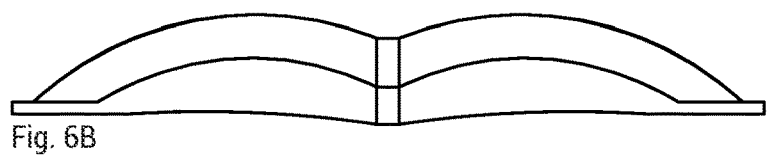
FIG. 6B shows a top view of the embodiment of FIG. 6A.
Figure 6A:
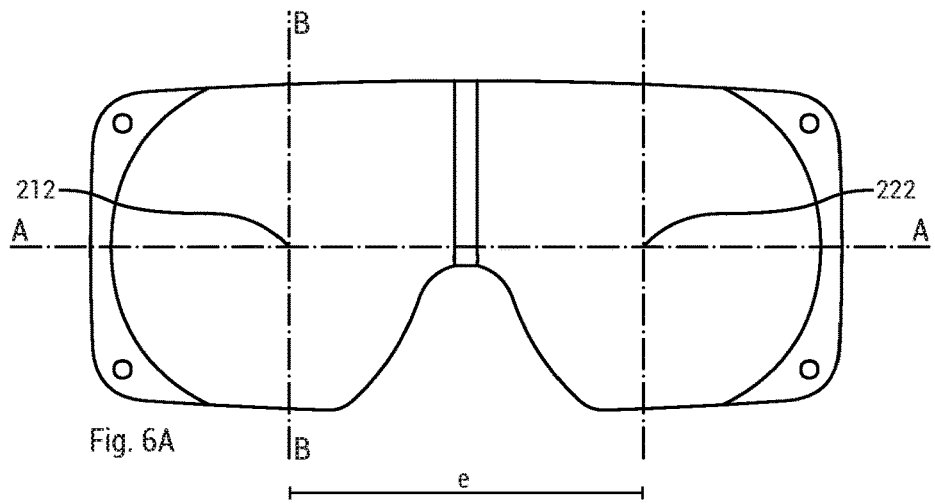
FIG. 6A shows a front view of the lens system of FIG. 5
Figure 6C:
FIG. 6C shows a side view of the embodiment of FIG. 6A.
Figure 6D:
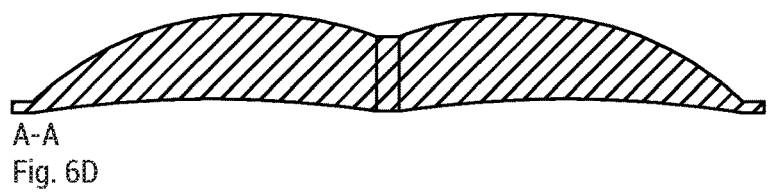
FIG. 6D shows a top cross sectional view of the embodiment of FIG. 6A.
Figure 6E:
FIG. 6E shows a side cross sectional view of the embodiment of FIG. 6A.
Figure 6F:
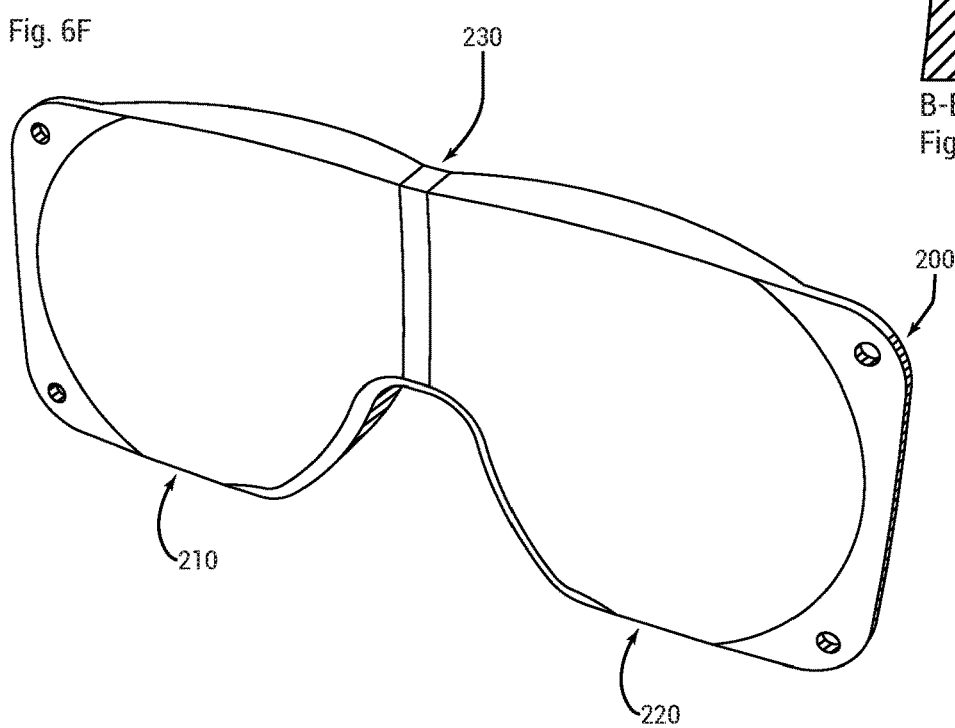
FIG. 6F shows an isometric view of the embodiment of FIG. 6A.

The lens system should be chosen the first and second optical centre are separated by a distance d corresponding to the inter pupillary distance (IPD) e. It is known that IPD starts around 53 mm and is mostly fixed at about 63 mm by the age of 20. While there are some variations for IPD it has been found that the size and position of the lenses provides about 63 mm tolerance before any discomfort becomes apparent. Reports show that 90 percent of the population has an IPD in the interval 54-68 mm with an average of 62 mm for women and 64 mm for men. Experiments show that a distance d of 62 mm works well. Due to the form of the lens it is not uncomfortable even if d is slightly larger than e FIGS. 6A-F show the lens system of FIG. 5 edge on. The prismatic components are seen by the lenses being somewhat asymmetric with a greater thickness at the centre compared to the outer edges. FIGS. 6A and 6F show the attachment 202 holes that are used to attach the lens system 300 to the frame 102. FIGS. 6D and 6E show cross sections A-A and B-B through FIG. 6A respectively.

ALTERNATIVE EMBODIMENTS

A number of variations on the above can be envisaged. For instance the unitary lens system can be used as a loupe for close up work on small details, such as for watch makes, surgeons, dentists etc. The lens system can be head mounted or mounted on an arm, to be held in position over the object to be viewed. It is possible to use the same attachment 202 for attaching the lens system 300 to the frame 102 as well as attaching the lens system to an arm or a handle for hand held operations.

In the case of a head mounted system this can be achieved by detaching the parts that relate to holding the screen 300, typically a smartphone. It is preferred that the sidewalls remain both in order to screen out lights from the sides as well as in order to protect the lens system from scratches and other wear.

For such loupe applications it is preferred to add means for illuminations, such as lamps, LEDs, fluorescent sources etc. Such illuminations can be provided around the periphery as well as in the bridge part 230 to provide bridge mounted illumination 232.

Figure 7:
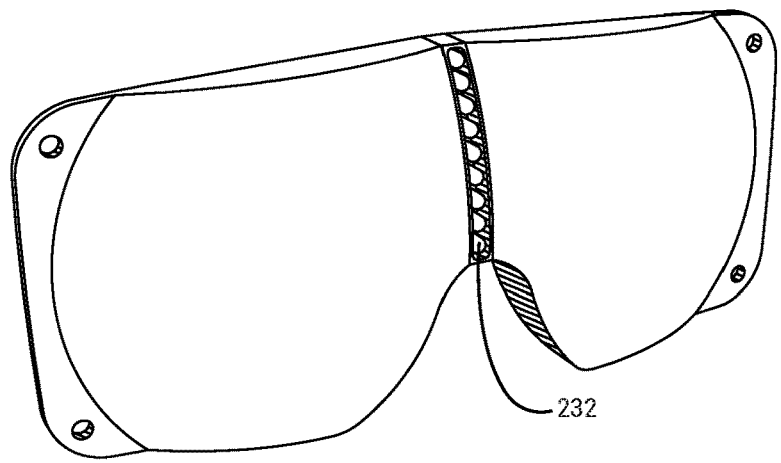
FIG. 7 shows an embodiment with bridge mounted illumination.

FIG. 7 shows an embodiment with bridge mounted illumination, where the bridge part is provided with a recess for inserting at least one light source as well as a lens to focus the emitted light onto the object being worked on. For a near field application like this also a wide angle light source such as LEDs can be used.

Figure 8:
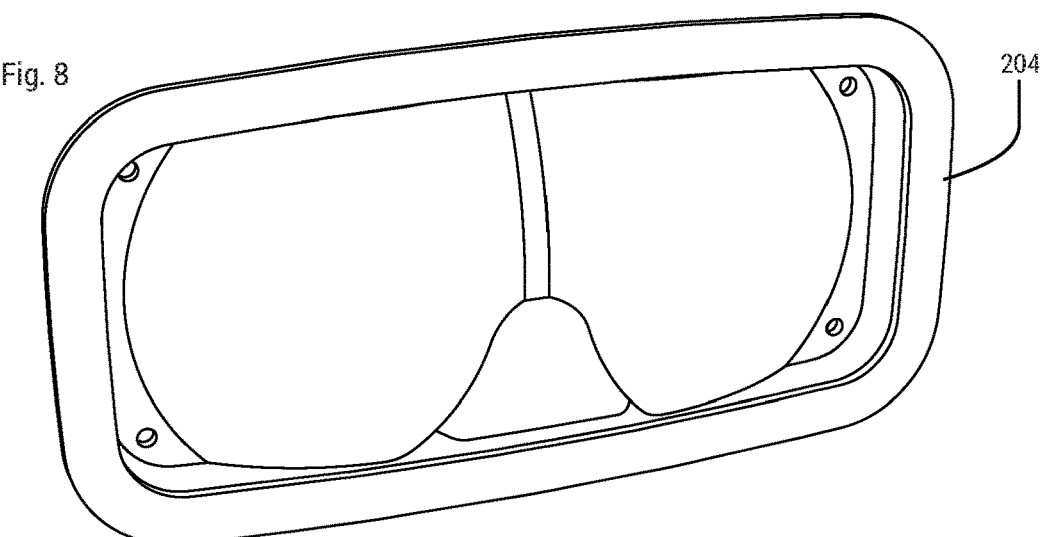
FIG. 8 shows an embodiment with perimetral illumination system.

FIG. 8 shows an embodiment with perimetral illumination system 204 disposed around the lens system 300. Since the lens is designed for near field use it is preferred that the illumination system directs the light inwards to make best use of the light available. LED lights can be used in such a system, preferably with lenses and/or angling inwards into the field of view.

Figure 9:
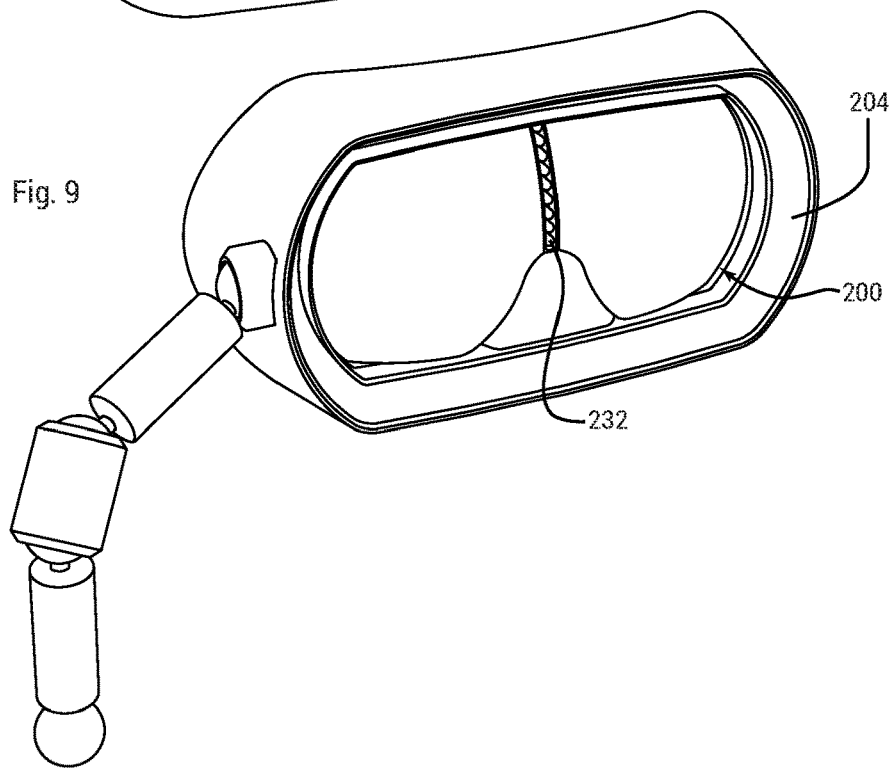
FIG. 9 shows an embodiment with a lens system having a perimetral illumination system, mounted on an arm

FIG. 9 shows a lens system having a perimetral illumination system 204 disposed around the lens system 300, mounted on an arm. Preferably the arm is attached to the lens system using a jointed arm that allows for a 360° range of movement. the lens system is attached to a frame that also comprises the illumination system and also affords some protection for the lens in order to avoid scratching of the optical surfaces.

Clearly a perimetral illumination system 204 can be combined with a bridge mounted illumination 232 and will allow for more room for light sources. In a near field application light will most likely be close to perpendicular to the field of view and excessive shadowing can occur. A combination of perimetral and bridge mounted illumination can therefore be advantageous. Shadows can be reduced also by providing the light sources with diffusors like frosted glass.

Since light sources, especially LEDs, can be individually addressed, these can be controlled by for instance an app to allow the user to adjust illumination to the task and object at hand.

Alternative materials to acryl are possible, such as Polycarbonate and COC (Cyclic Olefin Co-Polymer). In case of Polycarbonate, the index is higher which requires a redesign of the lens although it would be possible to achieve the same spherical and prismatic power more easily—with less curvature and less prism angle—since the refractive index of Polycarbonate is much greater than Acrylic. The lens system would therefore be thinner and lighter. Polycarbonate is also inert and has good impact resistance and so is a good plastic to use. There is however a drawback in that Polycarbonate is very easily scratched. For practical use, this would probably require both sides to be AR coated or unless the lens is in a sealed chamber where it will never be touched by the user.

Alternative use of the lens system in mobile based augmented reality is possible and would include a hole in the headset (100) allowing for the camera of the headset mounted screen (300), typically a smartphone, to see the outside world. Alternatively a camera, independent of the smartphone, can be mounted externally to the headset (100) to see the outside world.

INDUSTRIAL APPLICABILITY

The invention according to the application finds use in headsets.

The invention claimed is:

1. A unitary body lens system for a user having a first and second eye separated by an inter pupillary distance, comprising:
   a first lens having a first optical center,
   a second lens having a second optical center,
   wherein the first and second optical center are separated by a distance, said distance being aligned with the user's pupils inter pupillary distance when in use,
   wherein the first lens and the second lens are moulded as a single optical piece forming the unitary body, said first and second lenses being provided with a prismatic component in the interval +4-+14.

2. The unitary body lens system according to claim 1, wherein the lenses are provided a lens spherical diopter is in the interval +4-+12.

3. The unitary body lens system according to claim 1, wherein the lenses are provided a lens spherical diopter is in the interval +5-+10.

4. The unitary body lens system according to claim 1, wherein the lenses are provided a lens spherical diopter is in the interval +6-+7.

5. The unitary body lens system according to claim 1, wherein the lenses are provided with a prismatic component +2 greater than the spherical diopter.

6. The unitary body lens system according to claim 1, further comprising a notch to accommodate a user's nose.

7. The unitary body lens system according to claim 1, wherein a bridge part between the first and second lens and above the notch is provided with means for illumination.

8. The unitary body lens system according to claim 1, wherein the lens system is provided with a perimetral illumination system.

9. The unitary body lens system according to claim 1, wherein the distance between the first and second optical center is 60 mm-62 mm.

10. . A headset for viewing a headset mounted screen, comprising a unitary body lens system comprising:
    a first lens having a first optical center,
    a second lens having a second optical center,
    wherein the first and second optical center are separated by a distance, said distance being aligned with the user's pupils inter pupillary distance when in use,
    wherein the first lens and the second lens are moulded as a single optical piece forming the unitary body, said first and second lenses being provided with a prismatic component in the interval +4-+14,
    wherein the unitary body lens system is interposed between the screen and a user's eyes.

11. The headset according to claim 10, wherein distance between the first and second optical center align with the user's pupils inter pupillary distance when in use, so that the perceived reading distance is in the interval 25 cm-50 cm.

12. The headset according to claim 10, wherein distance between the first and second optical center align with the user's pupils inter pupillary distance when in use, so that the perceived reading distance is 30 cm.

13. The unitary body lens system according to claim 2, wherein the lenses are provided with a prismatic component +2 greater than the spherical diopter.

14. The unitary body lens system according to claim 3, wherein the lenses are provided with a prismatic component +2 greater than the spherical diopter.

15. The unitary body lens system according to claim 4, wherein the lenses are provided with a prismatic component +2 greater than the spherical diopter.

16. The headset according to claim 10, wherein the lenses are provided a lens spherical diopter is in the interval +4-+12.

17. The headset according to claim 10, wherein the lenses are provided a lens spherical diopter is in the interval +5-+10.

18. The headset according to claim 10, wherein the lenses are provided a lens spherical diopter is in the interval +6-+7.

19. The headset according to claim 10, wherein the lenses are provided with a prismatic component +2 greater than the spherical diopter.

* * * * *